US008626208B2

(12) United States Patent
Oesterling et al.

(10) Patent No.: US 8,626,208 B2
(45) Date of Patent: Jan. 7, 2014

(54) TRAFFIC DATA TRANSMISSION FROM A VEHICLE TELEMATICS UNIT

(75) Inventors: Christopher L. Oesterling, Troy, MI (US); Nathan Ampunan, Novi, MI (US)

(73) Assignee: General Motors LLC, Detroit, MI (US)

( * ) Notice: Subject to any disclaimer, the term of this patent is extended or adjusted under 35 U.S.C. 154(b) by 468 days.

(21) Appl. No.: 12/164,544

(22) Filed: Jun. 30, 2008

(65) Prior Publication Data
US 2009/0325612 A1  Dec. 31, 2009

(51) Int. Cl.
*H04W 4/00* (2009.01)
(52) U.S. Cl.
USPC ............. 455/466; 455/456.3; 455/575.9; 701/117; 701/70; 340/901; 340/932
(58) Field of Classification Search
USPC .................. 370/312, 313, 349, 464–503; 701/117–209; 455/456.1, 404.2, 466
See application file for complete search history.

(56) References Cited

U.S. PATENT DOCUMENTS

| 5,428,545 | A  | * | 6/1995 | Maegawa et al. | 701/210 |
|---|---|---|---|---|---|
| 6,996,089 | B1 | * | 2/2006 | Ruf et al. | 370/349 |
| 2002/0038182 | A1 | * | 3/2002 | Wong et al. | 701/213 |
| 2003/0204306 | A1 | * | 10/2003 | Yamamoto et al. | 701/200 |
| 2004/0203696 | A1 |  | 10/2004 | Jijina et al. |  |
| 2004/0249569 | A1 | * | 12/2004 | Oh | 701/209 |
| 2005/0096020 | A1 | * | 5/2005 | Oesterling et al. | 455/414.2 |
| 2006/0287808 | A1 | * | 12/2006 | Breitenberger et al. | 701/117 |

* cited by examiner

*Primary Examiner* — Rafael Pérez-Gutiérrez
*Assistant Examiner* — Keith Fang
(74) *Attorney, Agent, or Firm* — Anthony Luke Simon; Reising Ethington P.C.

(57) ABSTRACT

A method of sending traffic related data to a call center using a telematics unit of a vehicle. The method includes receiving a request at the telematics unit to transmit non-traffic data such as vehicle diagnostic information to the call center. Both the non-traffic data as well as traffic related data is obtained by the telematics unit and embedded into a short message service (SMS) message that is then sent to the call center. The traffic related data can be inserted only if it indicates a traffic problem and can be inserted into an otherwise unused portion of the SMS message. The received traffic related data can then be used by the call center or other remote facility to improve traffic reporting.

16 Claims, 3 Drawing Sheets

TRAFFIC DATA TRANSMISSION FROM A VEHICLE TELEMATICS UNIT

TECHNICAL FIELD

The present invention relates generally to transmitting information regarding traffic to a central location. More particularly, the invention relates to modifying a traffic report promulgated by a call center using data created or measured by a vehicle.

BACKGROUND OF THE INVENTION

Many users of motor vehicles rely on traffic reports to determine a route in which a driver may take to get to his or her destination. There are many methods for collecting traffic data for the purpose of traffic reporting. Traditionally, methods of observing traffic patterns include the use of airplanes, helicopters, traffic cameras, driver sightings and reportings and the like. Recently, wireless vehicle traffic probes have emerged.

All of these systems incorporate the use of observing what is perceived to be occurring on the road. However, a difficulty in utilizing many of these systems is that there is not always a way to identify in real time exactly what is occurring in the vehicles and reporting those events in an accurate manner.

SUMMARY OF THE INVENTION

According to an aspect of the invention, there is provided a method of sending traffic information to a call center using a telematics unit of a vehicle. The method begins with transmitting data from the vehicle modules to the telematics unit. A portion of the data transmitted to the telematics unit is identified as traffic related data. A message string containing the traffic related data is created. The message string is embedded into a short message service (SMS) message to be transmitted to the call center.

According to another aspect of the invention, there is provided a telematics unit for a vehicle comprising a plurality of inputs operatively connected to vehicle system modules to receive data therefrom. The telematics unit also includes a memory for storing data. The telematics unit also includes a processing device capable of identifying the traffic related data. The telematics unit further includes a cellular chipset that is used for transmission of the traffic related data to the call center. The traffic related data is embedded into an SMS text message that is sent to the a call center along with other non-traffic data in response to a request to send the non-traffic data. In this way, traffic related data can be opportunistically sent to the call center with other data without having to incur additional airtime or message transmission charges.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below facilitates the transmission of data relating to traffic events that are occurring and detected by vehicle system modules and sensors on the vehicle in a manner to further enhance the traffic reporting capabilities of a call center. This method incorporates the automatic transmission of this information making the reporting capabilities of the call center more accurate and less reliant upon human observation. The method incorporates the transmission of the data through short message service (SMS) text messages that do not increase the costs of communication between the vehicle and the call center.

Communications System—

Figure 1:
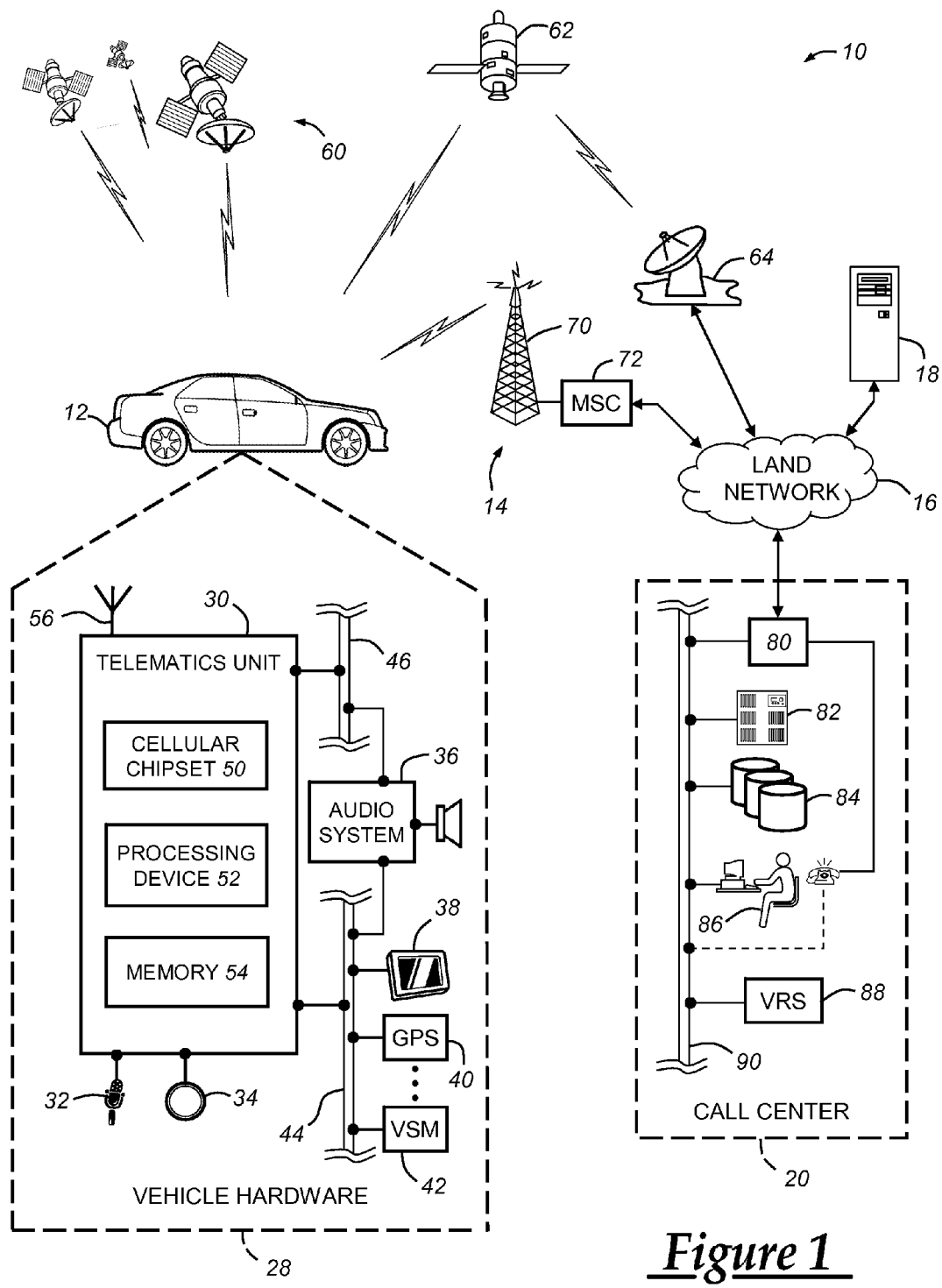
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42 having sensors (not shown). Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. This includes the communication of data in text format using short message service (SMS) messages. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. Using these components, telematics unit 30 can transmit and/or receive data or commands via the various communication approaches noted above, including via SMS messages, wherein the data can be incorporated into, for example, the text message portion (payload) of the SMS message. It should be appreciated that the modem can either be implemented through software that is stored in the telematics unit 30 and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the method discussed herein. In one embodiment, the processor 52 receives data from the VSMs 42 and segregates the data between traffic related data and non-traffic related data. With the traffic related data, the processor 52 can further correlate or classify the traffic related data based on the type of traffic data it is. For example, the vehicle 12 may slow down for a period of time. This data is different than airbag deployment data. The former example identifies increased traffic and the second signifies a possible traffic accident. As is discussed below, this information can be transmitted to the call center 20 using the cellular chipset 50.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. As noted above, the transmission of information from the vehicle 12 to the call center 20 or other location can be carried out in various ways including via SMS messages containing the transmitted data. Building and sending of SMS messages containing vehicle data can be done in response to a request at the telematics unit 30 to send the vehicle data. This request can be the result of a trigger occurring that was previously set on the vehicle, or can be a present request received from the call center or other remote facility. The use of triggers to cause vehicle data reporting via SMS messages can be done as disclosed in U.S. Published Patent Application No. 20040203696A1, the entire contents of which is hereby incorporated by reference.

At least some of the aforementioned vehicle system modules can be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMS) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
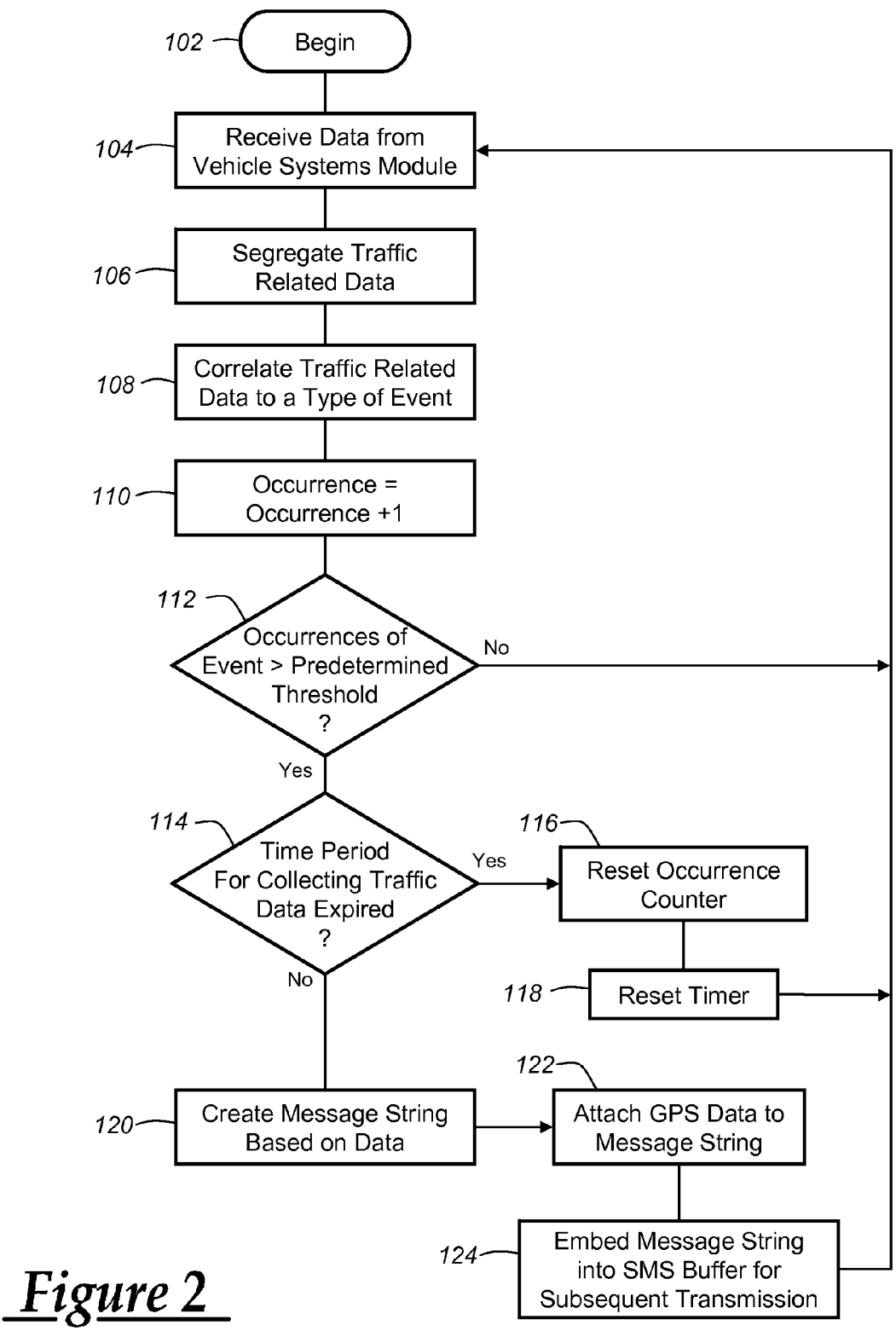
FIG. 2 is a logic chart of an exemplary embodiment of a method for sending traffic related data to a call center.

Turning now to FIG. 2, there is a logic chart of an embodiment 100 for sending traffic related data to a call center. The method begins at 102. The first step in the method is the receipt of the data from vehicle system modules 42 by the telematics unit 30. The vehicle system modules 42 may include sensors that measure certain activities. A non-exhaustive list of activities that might be sensed and reported to the telematics unit 30 includes mileage, component usage, diagnostic trouble codes (DTCs), the deployment of airbags, rapid decelerations, violent oversteer, and measuring extended periods of time in which the vehicle 12 is driving at five miles an hour or less.

Some of this data is considered traffic related data that can be indicative of a traffic problem or situation for which reporting is desired. Other of this data, however, is vehicle-related information concerning, for example, the operating condition of the vehicle or one or more of its components or systems. Therefore, the telematics unit 30 can identify the data it receives from the vehicle system modules 42 as either traffic related data or non-traffic data, and can segregate the data on this basis, as indicated at step 106. It will be appreciated by those skilled in the art that it is not necessary in all embodiments that the traffic related data be separately identified or segregated, but only that it be identifiable as traffic related data so that the call center knows what it is and, thus, how it can then be used. The telematics unit 30 can process and use the non-traffic data in ways known to those skilled in the art. For the traffic related data, the telematics unit 30 then identifies or correlates this data to a type of event at 108. If desired, different types of traffic related data may be identified and any one type of traffic related data occurring once may not require the notification of the call center 20 that a traffic related incident worthy of reporting has occurred. By way of example, the detection of a vehicle stopped while on a limited-access highway may be worthy of reporting as a traffic related incident or event. A single rapid deceleration may, however, not be considered worthy of a traffic related event and will only be reported if multiple rapid decelerations occur within a certain period of time. Thus, the method can include processing steps such as steps 110-118 to determine whether the traffic related data should be reported to the call center. These steps are used to process the traffic related data to determine if it meets at least one predefined criterion. In the example below, the method tests to determine if a particular traffic event (e.g., a rapid vehicle deceleration) occurs more than a predefined number of times within a certain time period. This could be used to determine that a traffic slowdown worth reporting has occurred where, for example, the vehicle undergoes two large slowdowns from highway speeds within a five minute period.

Once the traffic related data received by the telematics unit 30 is correlated or otherwise related to an event (e.g., highway slowdowns), the number of occurrences is counted at 110. This correlation can include more than just analysis of vehicle speeds and acceleration/deceleration, but could include an analysis of vehicle location to determine, for example, whether or not the vehicle is currently on a highway or other high speed roadway. As stated above, each type of event could have a different number for its occurrence count at which the traffic related data is to be reported to the call center. Thus, for example, stoppage of a vehicle while on a highway might use an occurrence count of only one so that a vehicle coming to full stop while on a highway or on the shoulder would be reported, whereas, a rapid deceleration while on the highway would not be reported unless it occurs two or more times within a short period of time. Thus, at step 112, it is determined whether the occurrence of the event has exceeded a predetermined threshold. If the predetermined threshold has not been exceeded, the method 100 loops back to step 104. If, however, the occurrence of an event has exceeded its predetermined threshold, the method then proceeds to step 114 and determines whether a time period for collection of the traffic data has expired (e.g., the five minute period). If the time period for collecting traffic data has expired, the occurrence counter is reset at 116, the timer is reset at 118, and the method 100 loops back to step 104. As with the occurrence of events, the time period for collecting traffic data for a particular type of event, if used at all, will vary from event to event. All of these occurrences predetermine thresholds and time periods can be stored in the memory 54 of the telematics unit 30.

If the occurrence of the events exceeds the predetermined threshold (identified at step 112) and the time period for collecting traffic data has not expired (at 114) based on the traffic data being collected, the traffic related data will be reported to the call center and a message string based on the data is therefore created at 120. The message string can be, for example, a text string identifying the type of traffic data collected and when it was collected. It is contemplated that in some embodiments the traffic related events can be characterized with the use of only three or four bits therefore potentially only requiring a single alphanumeric character to transmit the traffic related data. In other embodiments, the traffic data can be much longer.

Once the message string is created, additional data can be attached or merged with the message string at 122. The additional data can be a timestamp and/or GPS data gathered by the GPS module 40. Once this additional data is attached to the message string, the message string is embedded into a short message service (SMS) message at 124. It can be incorporated into the text message part (payload) of the SMS message or into another portion such as a buffer in the SMS message that is not used for anything related to the transmission of data. This buffer is used to ensure as much of the SMS message is transmitted to its desired destination in as complete and error-free form as possible. By adding the data to the SMS message buffer, the traffic information may be transmitted to the call center 20 in an SMS message that is generated for another purpose. In this way, an SMS message may have two functions, that being the primary message of the SMS message and the (secondary) traffic data of the SMS message. Because the traffic data is something that is desired by the call center and not necessarily desired by the operator of the vehicle 12, the use of the SMS message buffer is advantageous because it results no additional message delivery charges back to the call center or operator of the vehicle 12. Thus, this allows the traffic event data to be transmitted from the vehicle 12 to the call center 20 using a message created via SMS, thereby allowing the call center 20 to create a more accurate traffic report to be utilized by other drivers of other vehicles, all without incurring any extra airtime or message charges.

Figure 3:
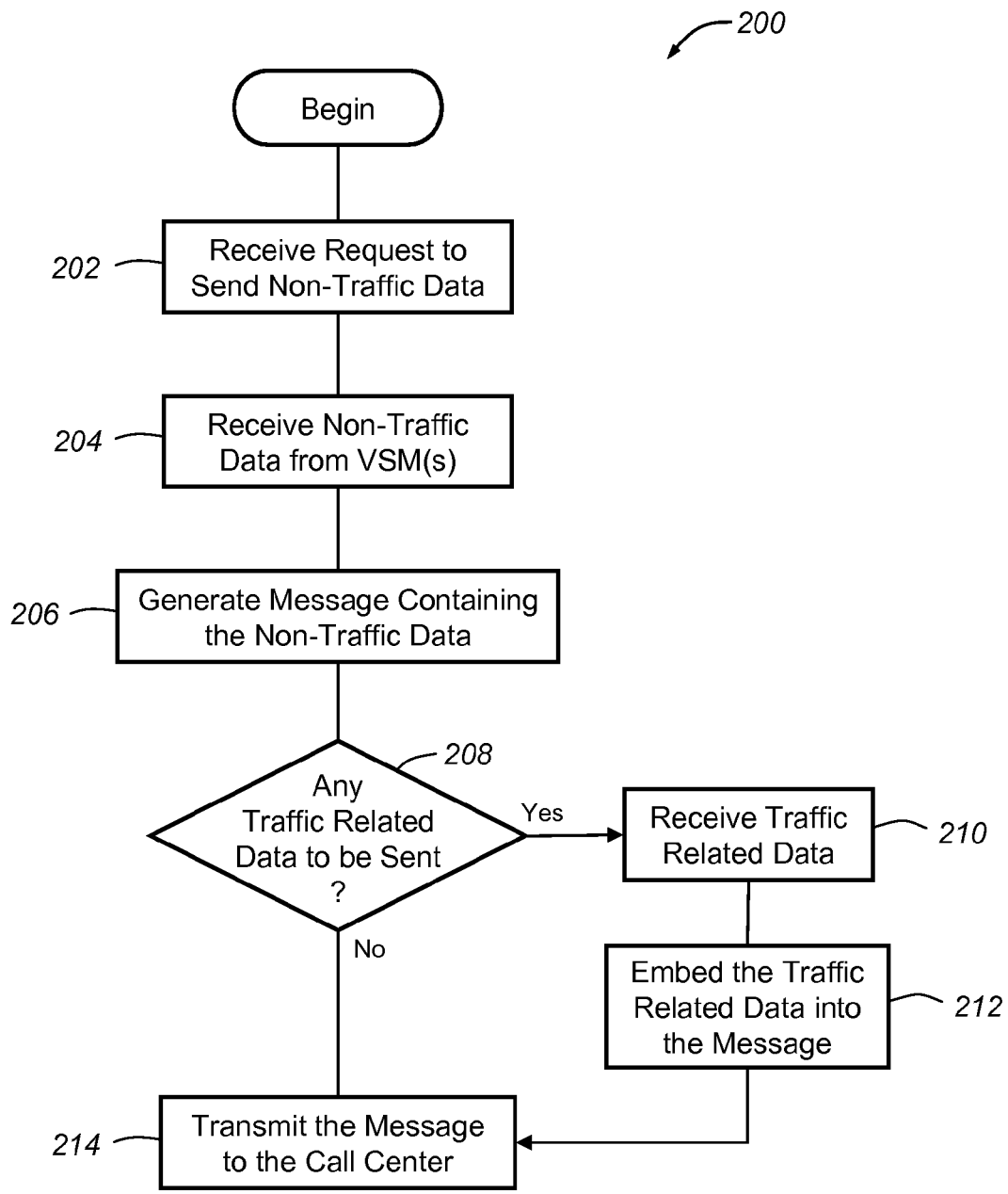
FIG. 3 is a logic chart of another exemplary embodiment of a method for sending traffic related data to a call center as a part of a communication message being sent to report other, non-traffic data.

With reference to FIG. 3, there is shown one exemplary method in which the traffic related data is incorporated into a communication message being sent to the call center for other purposes. In step 202, the telematics unit receives a request to send non-traffic data from the telematics unit to the call center. This can be, for example, a request resulting from the occurrence of a trigger on the vehicle to report diagnostic or other such information. Thus, at step 204, the telematics unit receives the non-traffic data from one or more of the vehicle system modules. A communication message is then generated at step 206. The system determines if there is any traffic related data at the vehicle that should be sent to the call center, step 208. If so, the telematics unit receives that traffic related data and embeds it into the message, as indicated at steps 210 and 212. Since there may be no request to send non-traffic data at the time that the traffic related data is generated, the system can temporarily store the traffic related data in memory, such as memory 54, so that it is available the next time a transmission request occurs. Steps 208 and 210 can be carried out prior to step 206 so that the embedding of the traffic related data at step 212 can be done as a part of originally generating the communication message at step 206. Once the message is created it is then transmitted to the call center, as indicated at step 214. Although this traffic data reporting method is particularly useful for transmission of traffic related data via SMS messaging, it will be appreciated that any suitable communication approach can be used.

Traffic related data received by the call center can then be used in a variety of ways to improve traffic reported, whether that is done by the call center itself or by some other entity. For this purpose, the traffic related data received from the vehicle can be combined with like information from other vehicles and used to more accurately identify traffic incidents. Such information can then be reported back to drivers having service subscriptions with the call center to provide them more accurate, timely information concerning traffic conditions.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for sending traffic information to a call center using a telematics unit of a vehicle, the method comprising:

(a) transmitting data measured by vehicle system modules to the telematics unit;

(b) identifying a portion of the data transmitted to the telematics unit in step (a) as traffic related data;

(c) detecting that vehicle deceleration occurs more than a predefined number of times within a certain time period;

(d) determining, based on the vehicle deceleration occurring more than a predefined number of times within a certain time period, that the portion of the data that has been identified as traffic related data will be transmitted to the call center; and (e) creating a message string containing the traffic related data;

(f) generating a short message system (SMS) message;

(g) automatically determining if there is any non-traffic related data at the vehicle to be sent to the call center using the telematics unit in response to generating the SMS message and, if so:

(g1) receiving the non-traffic related data at the telematics unit; and (g2) automatically embedding the message string containing the traffic related data into a portion of the SMS message that is unused by a short message service and including non-traffic related data obtained at the vehicle in a payload section of the SMS message; and (h) transmitting the message to the call center using the telematics unit.

2. A method as set forth in claim 1, including the step of attaching GPS coordinate information to the message string prior to embedding the message string in the SMS message.

3. A method as set forth in claim 1, including the step correlating the traffic related data to a type of traffic event to create correlated traffic data.

4. A method as set forth in claim 3, including the step of counting correlated traffic data to create an occurrence value.

5. A method as set forth in claim 4, including the step of comparing the occurrence value to a predetermined threshold.

6. A method as set forth in claim 5, including the step of measuring time for the occurrence value to exceed the predetermined threshold.

7. A method as set forth in claim 6, including the step of resetting the occurrence value to zero when the occurrence value fails to exceed the predetermined threshold within a time period.

8. A method as set forth in claim 1, including the step of establishing a time period for each type of traffic data measured.

9. A method as set forth in claim 1, further comprising the step of determining that the vehicle is on a high-speed roadway based on the vehicle location.

10. A method for sending traffic information to a call center using a telematics unit of a vehicle, the method comprising:

(a) receiving a request to send non-traffic related data that relates to the operating condition of a vehicle from a telematics unit to a call center;

(b) receiving the non-traffic related data at the telematics unit from one or more vehicle system modules;

(c) generating a short message system (SMS) message containing the non-traffic related data;

(d) automatically determining if there is any traffic related data at the vehicle to be sent to the call center using the telematics unit in response to the generated communication message containing the non-traffic related data and, if so:

(d1) receiving traffic related data at the telematics unit; and (d2) creating a message string containing the traffic related data and embedding the message string into a portion of the SMS message that is unused by a short message service; and (e) transmitting the message to the call center.

11. A method as set forth in claim 10, including the step of embedding GPS coordinate information into the message along with the traffic related data.

12. A method as set forth in claim 10, including the step correlating the traffic related data to a type of traffic event to create correlated traffic data.

13. A method as set forth in claim 12, including the step of counting correlated traffic data to create an occurrence value.

14. A method as set forth in claim 13, including the step of comparing the occurrence value to a predetermined threshold.

15. A method as set forth in claim 14, including the step of resetting the occurrence value to zero when the occurrence value fails to exceed the predetermined threshold within a time period.

16. A method as set forth in claim 10, wherein step (d) further comprises obtaining the traffic related data at the vehicle and determining if it meets at least one predefined criterion.

\* \* \* \* \*